United States Patent [19]

Langhans et al.

[11] 3,942,352
[45] Mar. 9, 1976

[54] METHOD OF MAKING SEAMLESS METAL TUBES

[75] Inventors: Walter Langhans, Langenhagen; Otto Uhlmann, Burgdorf; Norbert Stephan, Ahlem, all of Germany

[73] Assignee: Kabel-und Metallwerke Gutehoffnungshutte AG, Hannover, Germany

[22] Filed: Oct. 29, 1974

[21] Appl. No.: 518,815

[30] Foreign Application Priority Data
Oct. 20, 1973 Germany............................ 2352746

[52] U.S. Cl..................................... 72/275; 72/283
[51] Int. Cl.²............................................. B21C 1/00
[58] Field of Search ............ 72/275, 283, 254, 370, 72/203, 340; 83/1, 3

[56] References Cited
UNITED STATES PATENTS

| | | | |
|---|---|---|---|
| 170,806 | 12/1875 | Benwell | 72/275 |
| 2,183,861 | 12/1939 | Cotter, Sr. | 72/275 |
| 3,292,407 | 12/1966 | Poncar | 72/283 |
| 3,738,146 | 6/1973 | Gunn | 72/283 |

FOREIGN PATENTS OR APPLICATIONS

| | | | |
|---|---|---|---|
| 1,173,307 | 7/1964 | Germany | 72/275 |
| 1,177,901 | 9/1964 | Germany | 72/275 |
| 1,921,569 | 11/1969 | Germany | 72/275 |
| 418,456 | 9/1909 | France | 72/283 |
| 908,061 | 10/1962 | United Kingdom | 72/275 |

*Primary Examiner*—Lowell A. Larson
*Attorney, Agent, or Firm*—Ralf H. Siegemund

[57] ABSTRACT

A seamless pipe made by extrusion or piercing and having eccentric interior has the outside of one of its ends turned to concentric dimensions with its interior and is pulled through a peeling and scraping tool affixed to a positioning die, and over a mandrel which widens the pipe particularly in the zone of peeling.

6 Claims, 2 Drawing Figures

U.S. Patent  March 9, 1976  3,942,352
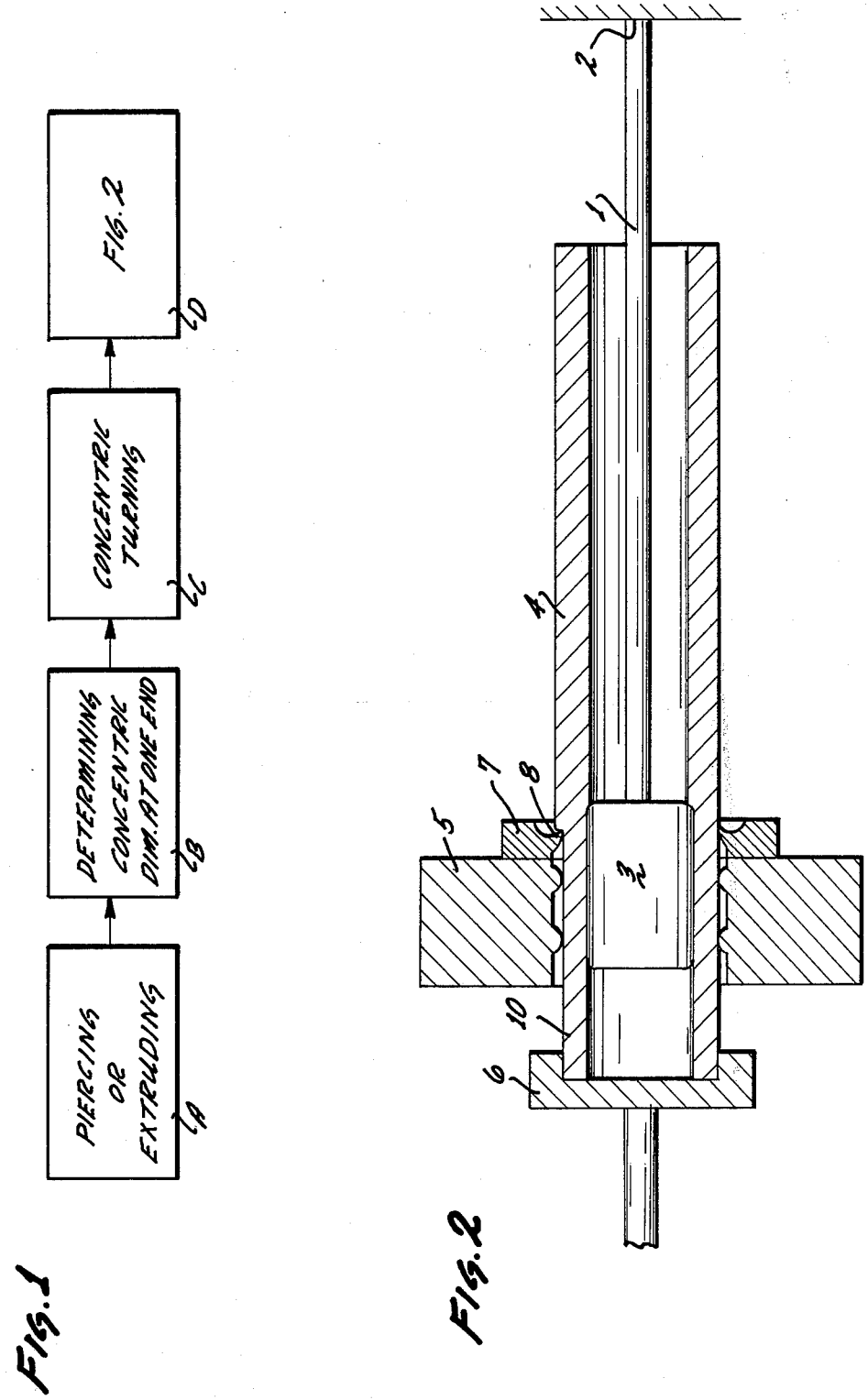

METHOD OF MAKING SEAMLESS METAL TUBES

BACKGROUND OF THE INVENTION

The present invention relates to improvements in a method of making seamless tubes or pipes, wherein a pipe, i.e. a hollow blank, has been made first e.g. by piercing or by extruding a billet.

Hollow blanks made by such a process are often subsequently drawn or stretch-rolled or otherwise reduced in diameter. However, it has been found that, regardless of such working, the resulting tube or pipe still has a bore which is eccentric to its outer surface. The eccentricity occurs predominantly in pipes made by extrusion, and subsequent cold rolling or drawing will not eliminate the eccentricity, at least not completely.

Pipe extrusion presses as used today operate in that the billet chamber receives a heated billet which is pierced by a mandrel, and the billet is extruded by a ram, through a die and around the mandrel. The mandrel assumes a floating disposition in and with respect to the surrounding extrusion flow. Unfortunately, the mandrel may be displaced relative to the die, e.g. up to 10% and that accounts for the eccentricity in the resulting pipes. Pipes made by piercing exhibit a displacement of center lines by about 5%. Subsequent cold rolling or drawing will eliminate some of the eccentricity, but not all of it.

DESCRIPTION OF THE INVENTION

It is an object of the present invention to provide a method and equipment for improving concentricity in seamless metal pipes.

In accordance with the preferred embodiment of the invention, it is suggested to machine one end of a seamless pipe made e.g. by extrusion or piercing in that, by turning this one end, the outer contour is machined to be concentric to the inner bore of the pipe. The pipe is drawn through a positioning die, over a mandrel for centering the pipe while being peeled on its outside, beginning adjacent the turned end, in that cutters scrape at least a portion of the surface of the pipe into conformity with the turned end and into contricity with the mandrel. The pipe is preferably expand slightly in the cutting and peeling zone. This way even ovally deformed and/or very eccentric or even indented pipes can be worked into exact concentricity with the circular interior.

In furtherance of the invention, the cutter is connected to the die and the mandrel traverses both of them. The pipe is drawn through the die in the direction so that the peeling and scraping by the cutter precedes the drawing through the die, while the mandrel widens the pipe in the cutting and peeling zone.

It may be advisable to employ multiple cutters to scrape and peel off several thin layers, if the eccentricity is significant. This way, one will extend the useful life of the cutting blades.

The scraped off shavings can be recycled to the smelting process to minimize waste.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a block diagram of the process in accordance with the preferred embodiment of the invention; and FIG. 2 is a cross-section through equipment for practicing the invention in accordance with the method outlined in FIG. 1.

Proceeding now to the detailed description of the drawings, we turn first to FIG. 1. Block A denotes summarily the known processes of working billets into seamless pipes or tubes. Such tubes or pipes are made either by a rolling process called piercing or by extrusion in a press. Either process is well known and does not require elaboration.

The seamless pipe making as per block A may also include additional working, such as stretch rolling and/or drawing to reduce the diameter of the pipe. As stated above, these conventional methods of size reducing do not eliminate eccentricities as resulting from the original process of making a hollow shape from a solid billet.

In the next step, block B of FIG. 1, one end of the resulting pipe or tube is taken and a desired outer diameter is determined in relation to the inner dimension of the tube or pipe as produced. This step can actually be seen in placing a lathe in particular relation to the center axis of the inner dimensions of the tube or pipe, for turning and cutting the outside of one end into a particular concentric configuration with the interior. Block C denotes the actual turning step so that an end portion of the tube or pipe is rather accurately machined here for obtaining an outer contour in rather accurate concentric relation of the cylinder as defined by the inner tube's wall at that end.

Block D denotes a subsequent drawing and peeling process which will be explained in greater detail with reference to FIG. 2.

The equipment illustrates in FIG. 2 includes a mandrel rod 1 which is secured to a frame or foundation at 2, while carrying a mandrel 3 on the other end. The mandrel is releasably secured to the mandrel rod.

In the illustrated position, mandrel 3 is already inside of a tube or pipe 4 and has a slightly larger diameter than the pipe. The pipe is quided through a positioning die 5 which is concentrically arranged to the mandrel 3. The drawing equipment used includes additionally a claw or other suitable holder 6 which engages one end of the pipe.

Die 5 or its support carries a cutter 7 with cutting blades 8 reaching towards the pipe 4 for peeling a layer of the pipe prior to insertion of any pipe portion into the die. The primary function of die 5, therefore, is to position the cutter blades concentric to the die opening as well as in concentric relation to the mandrel which traverses die 5. The mandrel projects with its rear portion out of the die and is radially aligned with the cutter blades.

After having described the equipment, we continue with the description of the process. It is assumed that end portion 10 of pipe 4 was turned in a lathe to have outer cylindrical contour which is precisely concentric to the inner cylinder contour of the pierced or extruded pipe at that end. This then is the preparation for the subsequent peeling process using the equipment shown in FIG. 2, whereby the pipe is worked to obtain uniformly concentric outer dimensions under strengthening of the pipe material.

The mandrel rod 1 is placed inside of the pipe 4 (or the latter is moved over the former) and the mandrel 3 is affixed to the end of the rod. At this point, mandrel 3 is completely outside of the pipe, but adjacent the turned end 10 thereof. Next, this turned end 10 is shifted into die 5. Moreover, the die 5 and the mandrel 3 have been placed in exactly concentric disposition to each other, and the cutter 7 has also exactly concentric position thereto. As the pipe end 10 is inserted into the positioning die 5 from the cutter end (from the right in FIG. 2), no scraping or peeling takes place, which requires that the pipe end is actually machined to a slightly smaller diameter than the cutting circle so that the widening of the pipe which will occur right from the pipe's end, will not result in cutting as the pipe is moved into the positioning die 5. The cutting circle is, however, slightly larger than the die opening, so that the die acts also as drawing die causing in effect strengthening of the material.

The pipe may have to be pushed into the die and over the mandrel until the end of the machined portion 10 is reached (then abutting the cutter). One can see here a rule for the axial length of the machined turned portion 10; it must be sufficiently long that the end proper of the pipe projects through die 5 sufficiently far so that holder 6 can grip that end, before the cutters reach the unmachined portion of the pipe.

The final preparatory step is connecting the pipe 4 to holder 6, and the drawing and peeling process begins in that holder 6 pulls the pipe through die 5 and over mandrel 3. The portion of the pipe beyond the turned end will immediately be cut and peeled to an exactly concentric configuration with regard to mandrel 3 which sizes the interior of the tube. The scraping and peeling does not necessarily involve the entire surface of the pipe, particularly, if removal of eccentricity between inner and outer contours is the sole or main purpose. In that instance, the cutting and peeling may be restricted or predominantly restricted to the thicker wall portions of the pipe.

It is quite important that the blades 8 of cutter 7 perform the peeling and scraping operation right adjacent the mandrel as the mandrel forces material into the range of the cutter and the cut portion of the pipe passes through die 5, also adjacent the mandrel.

The equipment shown in the drawing has a single set of cutting blades. However, if the material to be removed is extensive, it may be advisable to peel several layers and to reduce the outer dimensions in steps of peeling and scraping, so that each blade is relieved from taking the entire load. Hence, in such instance, one will arrange several sets of blades, each following one cutting to slightly smaller diameter than the preceding set.

The pipe shown is of straight configuration, however, one can process also curved pipes using a current mandrel rod and mandrel accordingly, to obtain a concentric configuration of the pipe with regard to the center line.

One can also size the pipe in the stated manner, if originally the pipe has not only excentric interior but is ovally deformed.

The inventive method permits the manufacture of pipes with rather accurately concentric inner and outer surfaces, with lower weight as compared with other pipes of similar outer diameter.

The invention is not limited to the embodiments described above, but all changes and modifications thereof not constituting departures from the spirit and scope of the invention are intended to be included.

We claim:

1. In a method of making seamless tubes or pipes which have been made by extruding or piercing metal billets, the improvement comprising:
    turning a pipe at its end to obtain a relatively short end portion of exact concentricity of its outer dimensions with regard to the inner dimensions of the pipe;
    drawing the pipe through a positioning die and over a mandrel which is concentrically arranged to the die, beginning with the turned end;
    said mandrel centering, positioning and supporting the interior of the pipe also in relation to a concentric peeling and scraping tool disposed radially adjacent to the mandrel, outside of the pipe; and
    peeling and scraping at least a portion of the outer surface of the pipe by means of said tool, ahead of the die and adjacent to the mandrel.

2. In a method as in claim 1, and including the step of radially widening the inner dimensions of the pipe in the zone of peeling.

3. In a method as in claim 2, wherein the mandrel has slightly larger diameter than the inner diameter of the pipe to obtain a radial expansion of the pipe by the mandrel during peeling.

4. In a method as in claim 1, wherein the peeling is carried out by several sequentially effective cutting steps each cutting the pipe to a slightly smaller diameter than the preceding one.

5. A device for achieving concentricity along the entire length of a seamless tube or pipe which has been made by extruding or piercing a billet, the tube or pipe having an end turned to obtain a relatively short end postion of exact concentricity of its outer dimensions with regard to the inner dimensions of the tube or pipe, comprising a mandrel on a mandrel rod held in a particular position for insertion into the pipe and supporting the pipe from the inside;
    a positioning die disposed in radial alignment with the mandrel, the mandrel projecting somewhat from the die in the direction opposite the direction of drawing the pipe over the mandrel; and
    scraping blades disposed at the die, radially facing the projecting portion of the mandrel for peeling and scraping off a portion of the outer surface of a pipe when moved through the die, beginning adjacent the turned end.

6. In a device as in claim 5, the mandrel having slightly larger diameter than the inner diameter of the pipe being worked.

* * * * *